Figure 1:
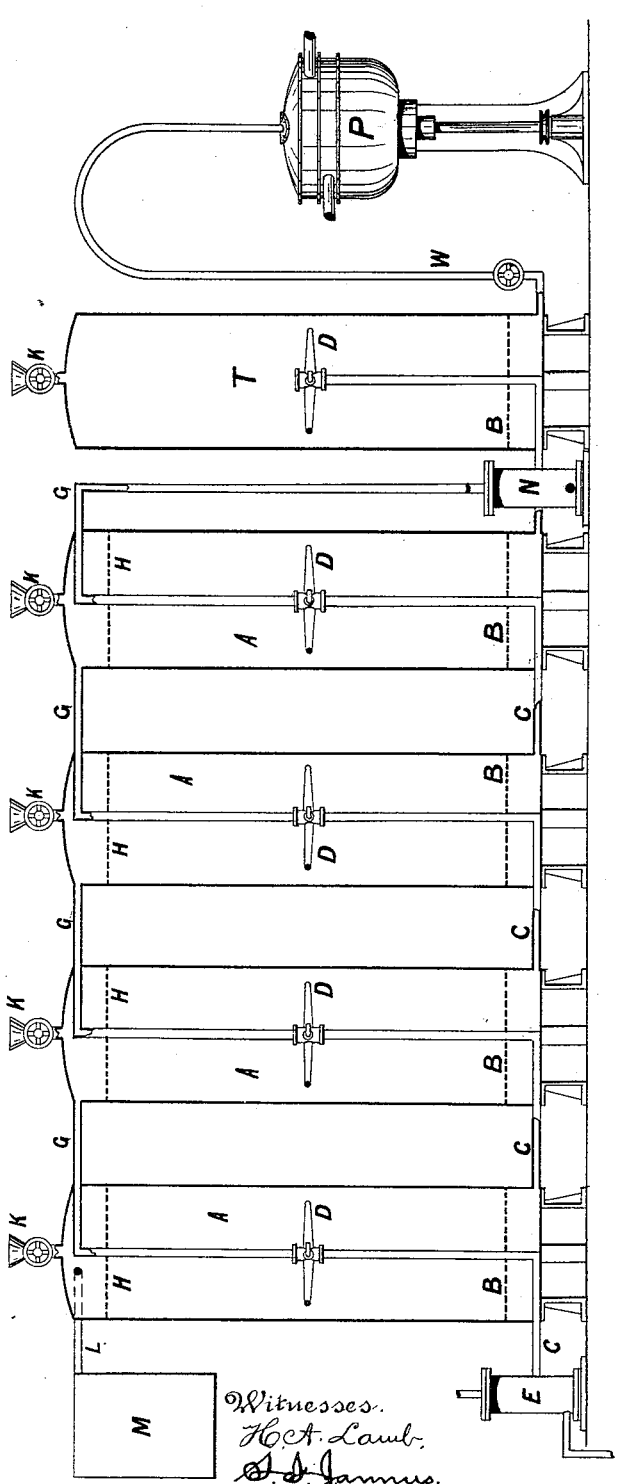

(No Model.) 2 Sheets—Sheet 1.

T. G. BOWICK.
PROCESS OF PURIFYING ALCOHOL.

No. 391,015. Patented Oct. 16, 1888.

Witnesses.
H. A. Lamb.
S. S. Jannus.

Inventor.
Thomas Gilbert Bowick.
By his Attorney
Frankland Jannus.

(No Model.)　　　　　　　　　　　　　　　　2 Sheets—Sheet 2.
T. G. BOWICK.
PROCESS OF PURIFYING ALCOHOL.
No. 391,015.　　　　　　　　　　Patented Oct. 16, 1888.
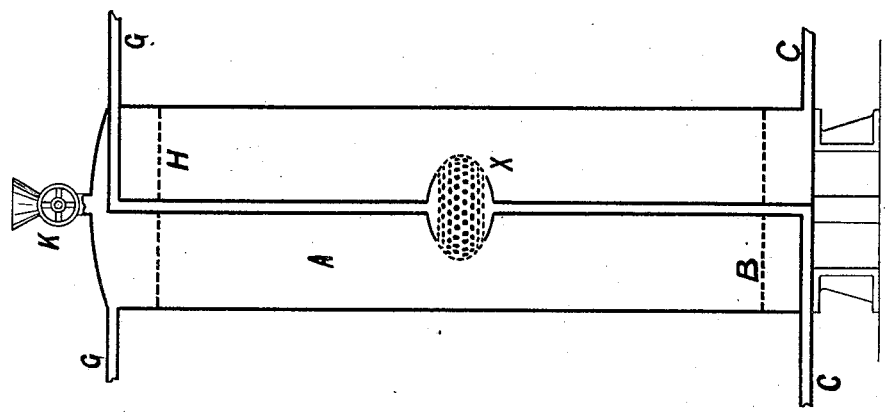
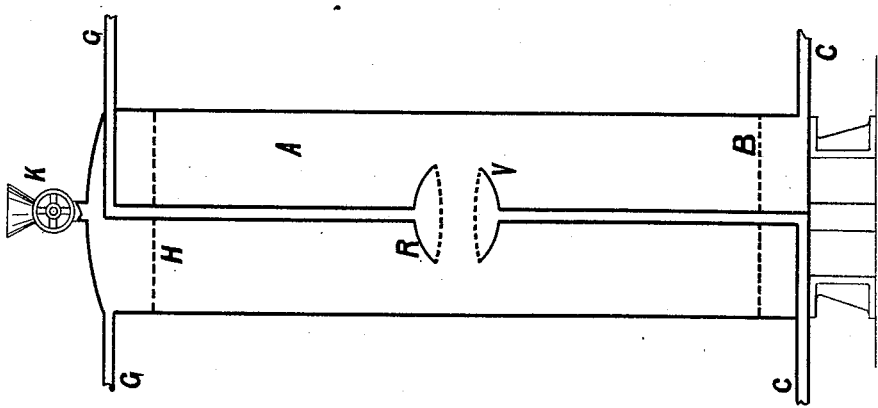
Witnesses,　　　　　　　　　　　　　　Inventor,
H. A. Lamb.　　　　　　　　　　　Thomas Gilbert Bowick.
S. I. James.　　　　By his Attorney
　　　　　　　　　　Frankland James.

UNITED STATES PATENT OFFICE.

THOMAS GILBERT BOWICK, OF HARPENDEN, COUNTY OF HERTS, ENGLAND.

PROCESS OF PURIFYING ALCOHOL.

SPECIFICATION forming part of Letters Patent No. 391,015, dated October 16, 1888.

Application filed November 2, 1887. Serial No. 254,104. (No specimens.) Patented in England October 29, 1887, No. 14,737; in France November 4, 1887, No. 186,780; in Germany November 11, 1887, No. 43,695; in Luxemburg March 20, 1888, No. 968; in Norway March 24, 1888, No. 863, and in Italy May 3, 1888, XLV, 467.

*To all whom it may concern:*

Be it known that I, THOMAS GILBERT BOWICK, chemist, a subject of the Queen of England, residing at Harpenden, in the county of Herts and Kindom of England, have invented certain new and useful Improvements in the Process of Purifying Alcohol, (for which I have obtained the following patents: In England October 29, 1887, No. 14,737; in France November 4, 1887, No. 173,864; in Germany November 10, 1887, No. 17,567; in France November 4, 1887, No. 186,780; in Luxemburg March 20, 1888, No. 968; in Italy May 3, 1888, No. 467, Vol. XLV; in Norway March 24, 1888, No. 863, and in Germany November 11, 1887, No. 43,695,) of which the following is a specification.

My invention relates to a new and useful process and apparatus for the purification of alcohol by means of hydrocarbons.

Many attempts have been made to refine alcohol by means of hydrocarbons. Among other processes, the vapor of impure alcohol was either distilled through the hydrocarbon or the alcohol was filtered through a porous material impregnated with hydrocarbons contained in one or more vessels at the pressure of the atmosphere, or hydrocarbons were passed through a column of alcohol. In neither of these cases could the alcohol be brought into a sufficiently intimate contact with the hydrocarbons, in consequence of which only a partial purification of the alcohol from its accompanying ethers—fusel-oil and others—was effected, and the operation required a very considerable time.

My invention consists of a series of operations which in combination constitute a novel process, the essential features of which are that the alcohol is brought in an atomized condition into the most intimate contact with the hydrocarbon, thereby forming an emulsion, in consequence of which the alcohol is liberated absolutely from all its impurities and in the very shortest space of time.

It consists, further, in providing means of separating the emulsion formed between the two liquids by osmotic action; also, in that the various higher alcohols or ethers constituting these impurities each separately are recovered from the purifying medium and can be added to the purified alcohol of such quality and to such extent as to impart the flavor to the pure alcohol, which forms the difference between alcohol as such and the whisky or other distilled spirits used for consumption.

The series of operations forming my process consist in forcing the alcohol under great pressure through a pipe provided with a rose having fine perforations in an upward direction into and through a series of closed vessels containing a hydrocarbon of lighter specific gravity than the alcohol itself; in forcing hydrocarbons under great pressure through a pipe provided with a rose having fine perforations in the opposite direction to those of the first-mentioned rose against and into the alcohol which is being forced out of the first rose, thereby atomizing the alcohol as it issues from the rose; or the pipe through which the alcohol is forced and the pipe through which the hydrocarbon is forced may both terminate in the same rose, and both fluids be forced together through the same perforations; or, preferably still, both pipes may terminate in a four-bladed small turbine or sparger made to revolve by the efflux of the two combined fluids out of the end openings of its blades, the result in every case being a most intimate emulsion of the two fluids; in causing the emulsion to pass through a column of alcohol of constant height at the bottom of each cylinder, a porous diaphragm being placed in the body of the column of alcohol, in order to promote by osmotic action incipient separation of the emulsion of the alcohol and hydrocarbon and to force nearly clear alcohol downward and into the succeeding cylinder; in placing a porous diaphragm near the top of each cylinder, in order to cause the separation of the hydrocarbon and alcohol and to force nearly clear hydrocarbon upward in the opposite direction into the succeeding cylinder; in forcing the alcohol coming from the series of hydrocarbon-cylinders through a cylinder—the last in the series—containing pure alcohol only, in order to still further separate the emulsion of the alcohol and hydrocarbon; but if from too rapid working the alcohol should still be slightly charged with hydrocarbon, I pass it into a centrifuge of similar construction to those used for the separation of cream from milk, in order to absolutely separate the last traces of hydrocarbon from the alcohol; and in recovering the ethers taken up by the hydrocarbon, each separately, by means of fractional distillation, and adding them at will, after rectification of the purified alcohol, to the pure alcohol as flavoring material.

For the better comprehension of my invention, I will now proceed to describe my process by reference to the accompanying drawings, upon which—

Figure 2:
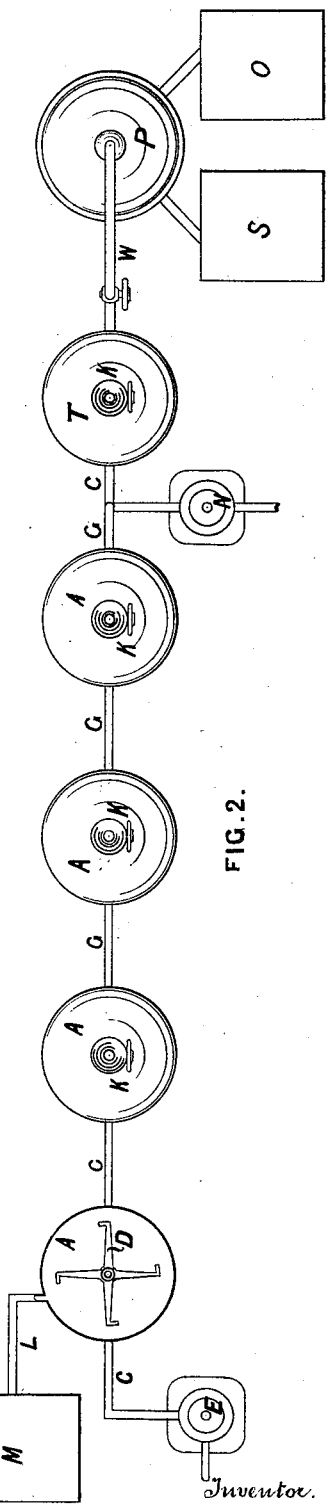

Figure 1 is a sectional elevation, and Fig. 2 a sectional plan, of my purifying apparatus with five cylinders, the upper portion of one of the cylinders being removed, Figs. 3 and 4 showing modifications of part thereof.

In carrying out my process I employ a series of cylinders, A—say seven in number. Assuming these cylinders to be, say, seven feet high by two feet in diameter, each cylinder is filled to a height of, say, two feet with pure alcohol, while the last of the series, T, is filled entirely with pure alcohol. At about, say, six inches from the bottom of each cylinder is placed a diaphragm, B, which consists of two perforated metal plates covered on the inner side with a layer of canvas, between which is placed filtering-paper or any suitable porous material. There are therefore eighteen inches of pure alcohol over the diaphragm. The remaining five feet over the column of alcohol are filled entirely through the funnels K with a well-refined fluid hydrocarbon of a specific gravity of about 850 to 880. Say six inches from the top of each of the first six cylinders (the first four on the drawings) is placed a similar diaphragm, H. I then, by means of the pump E, force the impure alcohol (which is to contain about two parts of water to one of alcohol) through the pipe C and turbine D into the supernatant hydrocarbon. At the same time I force hydrocarbon, by means of the pump N and pipes G, into the same turbine, D. In this manner constant streams of alcohol and of hydrocarbon are simultaneously forced out of the end openings of the blades of the turbine, which, on account of the efflux of the liquids, revolves with great velocity in the body of the hydrocarbon and causes a most intimate emulsion of the latter with the alcohol; or, as shown at Fig. 3, I may use two roses placed exactly opposite each other, the rose R being for the introduction of the hydrocarbon in spray, and the rose V for the alcohol; or, as shown at Fig. 4, I may use a single rose, X, for the simultaneous introduction of the hydrocarbon and alcohol into the hydrocarbon contained in the closed cylinder. The alcohol, being of the greater specific gravity, descends through the column of hydrocarbon, begins to separate on arriving at the column of alcohol, and, separating still further through osmotic action, on reaching the porous diaphragm at the bottom the alcohol, but slightly emulsed with hydrocarbon and partially purified, is forced into the succeeding cylinder through pipe C, where it undergoes the same operation and further purification, until on its arrival at the last of the series of cylinders, T, the alcohol should be free from any of the ethers. The last of the series of cylinders, T, being entirely filled with pure alcohol, the final separation of the emulsion takes place, and the alcohol may be drawn off through the bent pipe W to a store-tank, and the aldehyde contained in the alcohol may then be neutralized with alkali and the purified alcohol rectified, ready for the market.

Should the working have been too rapid, and the alcohol consequently be still slightly charged with hydrocarbon, the alcohol is then pumped through the bent pipe W onto a centrifuge, P, similar to the separators of cream from milk, and the last particles of hydrocarbons are here separated from the alcohol. The former flows into the tank O and the latter into the tank S. The hydrocarbon forced by the pump N flows in an opposite direction through the series of cylinders A, and separates from the alcohol through osmotic action by means of the porous diaphragms H, placed near the top of the cylinder, and passes through the connecting-pipe L into a tank, M, from which it is pumped into a still, in which the last traces of alcohol, as well as the fusel-oil and other ethers taken up from the impure alcohol, are separated from the hydrocarbon by means of fractional distillation, and such of the ethers added after rectification to the purified alcohol, which will impart to it the flavor desired in whisky and in other distilled spirits of consumption.

The apparatus herein shown and described in connection with my improved process for the purification of alcohol is not specifically herein claimed, the same forming the subject-matter of a separate application filed September 21, 1888, Serial No. 285,955.

Having fully described my invention, what I desire to claim and secure by Letters Patent is—

1. The herein-described process of purifying alcohol, which consists in forming an emulsion of impure alcohol and a hydrocarbon of lighter specific gravity than the alcohol, partially separating the purified alcohol and hydrocarbon by gravity, and further separating the hydrocarbon and alcohol by osmotic action, as set forth.

2. The herein-described process of purifying alcohol by means of hydrocarbon, which consists in a series of like operations, each operation comprising forming an emulsion of impure alcohol and a hydrocarbon of lighter specific gravity than the alcohol, partially separating the purified alcohol and hydrocarbon by gravity, and further separating the hydrocarbon and alcohol by osmotic action, as set forth.

3. The herein-described process of purifying alcohol, which consists in forming an emulsion of impure alcohol and a hydrocarbon of lighter specific gravity than the alcohol, partially separating the purified alcohol and hydrocarbon by gravity, and further separating the hydrocarbon and alcohol by osmotic action, then recombining the hydrocarbon with other and less purified alcohol as an emulsion, then again partially separating the hydrocarbon and alcohol by gravity, and further by osmotic action, substantially as set forth.

4. The herein-described process of purifying alcohol by means of hydrocarbon, which consists in a series of like operations, each operation comprising forming an emulsion of impure alcohol and a hydrocarbon of lighter specific gravity than the alcohol, partially separating the purified alcohol and hydrocarbon by gravity, further separating the hydrocarbon and alcohol by osmosis, and then finally completing the separation by centrifugal action, as set forth.

5. The herein-described process of purifying alcohol, which consists in forming an emulsion of impure alcohol and hydrocarbon of lighter specific gravity than the alcohol, partially separating the purified alcohol and hydrocarbon by gravity, and further separating the hydrocarbon and alcohol by osmotic action, then recombining the hydrocarbon with other partially-purified alcohol to form an emulsion, then partially separating the hydrocarbon and alcohol by gravity, and further separating the same by osmotic action, repeating the process until the hydrocarbon absorbs all or nearly all the impurities of the alcohol, and then completing the separation by centrifugal action, as set forth.

THOMAS GILBERT BOWICK.

Witnesses:
GEO. J. B. FRANKLIN,
HERBERT E. DALE,
*Both of 17 Gracechurch Street, London, E. C.*